(12) United States Patent
Trachewsky et al.

(10) Patent No.: US 7,409,196 B2
(45) Date of Patent: Aug. 5, 2008

(54) RFIC TRANSMIT POWER CONTROL

(75) Inventors: Jason A. Trachewsky, Menlo Park, CA (US); David (Chuong) Lam, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/711,948

(22) Filed: Feb. 27, 2007

(65) Prior Publication Data

US 2007/0249382 A1 Oct. 25, 2007

Related U.S. Application Data

(63) Continuation of application No. 10/760,878, filed on Jan. 20, 2004, now Pat. No. 7,203,511.

(51) Int. Cl.
*H01Q 11/12* (2006.01)
(52) U.S. Cl. .............. 455/127.3; 455/118; 455/125; 455/114.1; 455/114.2; 455/114.3
(58) Field of Classification Search ............. 455/114.2, 455/115.1, 118, 119–127.4
See application file for complete search history.

(56) References Cited

U.S. PATENT DOCUMENTS

| | | | | |
|---|---|---|---|---|
| 6,201,802 B1 * | 3/2001 | Dean | ........................ | 370/350 |
| 6,292,122 B1 * | 9/2001 | Younis et al. | ............... | 341/143 |
| 6,462,617 B1 * | 10/2002 | Kim | .............................. | 330/2 |
| 6,504,425 B1 * | 1/2003 | Kim | .............................. | 330/2 |
| 6,535,564 B1 * | 3/2003 | Mandyam | .................... | 375/353 |
| 6,903,604 B2 * | 6/2005 | Kim | .............................. | 330/2 |
| 7,106,806 B1 * | 9/2006 | Kenington | .................. | 375/297 |
| 7,113,757 B2 * | 9/2006 | Chu et al. | ................. | 455/127.1 |
| 7,271,465 B2 * | 9/2007 | Jessie et al. | .................. | 257/531 |
| 7,321,635 B2 * | 1/2008 | Ocenasek et al. | ........... | 375/297 |
| 2003/0146787 A1 * | 8/2003 | Hedberg et al. | ............. | 330/149 |
| 2004/0203472 A1 * | 10/2004 | Chien | .......................... | 455/68 |
| 2005/0148300 A1 * | 7/2005 | Salvi et al. | ................. | 455/63.1 |

\* cited by examiner

*Primary Examiner*—Matthew Anderson
*Assistant Examiner*—Dominic E Rego
(74) *Attorney, Agent, or Firm*—Garlick Harrison & Markison; Timothy W. Markison

(57) ABSTRACT

An RFIC transmitter includes a digital transmit processing module, a digital to analog converter, a filter and gain module, an up-conversion module, a power amplifier, and a transmit signal strength module. The transmit signal strength module is coupled to generate a gain adjust signal based on a measure of transmit power of an outbound RF signal, wherein the transmit signal strength module provides the gain adjust signal to at least one of the digital transmitter processing module, the digital to analog converter, the filter and gain module, the up-conversion module, and the power amplifier.

8 Claims, 5 Drawing Sheets transmit power control module 102

RFIC TRANSMIT POWER CONTROL

This patent application is claiming priority under 35 USC § 120 as a continuing patent application of co-pending patent application entitled CONTROL OF TRANSMIT POWER OF A RADIO FREQUENCY INTEGRATED CIRCUIT, having a filing date of Jan. 20, 2004, and a Ser. No. of 10/760,878.

BACKGROUND OF THE INVENTION

1. Technical Field of the Invention

This invention relates generally to wireless communication devices and more particularly to radio frequency transmitters used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is further known, the transmitter of a wireless communication device transmits RF signals that represent baseband processed data to the receiver of another wireless communication device directly or through an access point, or base station. The particular type of baseband processing used to prepare the data for radio frequency transmission and subsequent data recapture by the receiver is dependent upon the standard, or standards, being supported by the wireless communication devices and upon the received signal strength of the RF signals. For example, if the standard being supported is IEEE802.11g, the baseband processing may include encoding data at 1 or 2 megabits-per-second using a direct sequence spread spectrum (DSSS) encoding protocol, a 5.5 or 11 megabits-per-second complimentary code keying (CCK) encoding protocol, or a 6, 9, 12, 18, 24, 36, 48, or 54 orthogonal frequency division multiplexing (OFDM) encoding protocol.

The particular encoding protocol selected is at least partially based on received signal strength indication (RSSI). In general, the weaker the signal strength of the received RF signal, the lower the data rate. As is known, the transmitter transmits RF signals at a fixed output power level (e.g., 10 dBm) such that the decrease in receive signal strength is primarily due to physical distance between the transmitter and receiver. Thus, the greater the distance, the weaker the received signal will be, requiring a lower data rate encoding protocol to be used. Further, when the received signals are weak, the data recovery circuitry within the receivers may have difficulty recapturing the data resulting in a retransmission of the data or loss of data, either of which reduces data throughput.

One solution for improving received signal strength is to raise the transmit power level such that the received signal strength would correspondingly increase. While this would help for weaker received signal strengths, it is overkill for stronger received signals and would unnecessarily consume additional power in the transmitter, which, for battery operated wireless communication devices is extremely detrimental.

Therefore, a need exists for a method and apparatus for adjusting transmit power levels, while maintaining the particular transmit power level constant, without increasing power consumption and further improving data throughput.

BRIEF SUMMARY OF THE INVENTION

The control of transmit power of a radio frequency integrated circuit of the present invention substantially meets these needs and others. In one embodiment, a method for controlling transmit power of a radio frequency integrated circuit begins by sampling a continuous transmit signal strength indication (TSSI) for a predetermined number of sampling cycles to produce a plurality of TSSI samples. The process then proceeds to determine a normalized TSSI from the plurality of TSSI samples. The processing continues by converting the normalized TSSI into an estimated transmit power. The process continues by comparing the estimated transmit power with a desired transmit power. The processing then continues by determining a transmit power error based on the comparison of the estimated transmit power with the desired power. The process then continues by adjusting gain of a transmit section of the radio frequency integrated circuit based on the transmit power error such that the estimated transmit power substantially matches the desired transmit power. With such a method and corresponding apparatus, the output power of a radio frequency integrated circuit may be accurately regulated at multiple output power levels.

BRIEF DESCRIPTION OF THE SEVERAL
VIEWS OF THE DRAWINGS

DETAILED DESCRIPTION OF THE INVENTION

Figure 1:
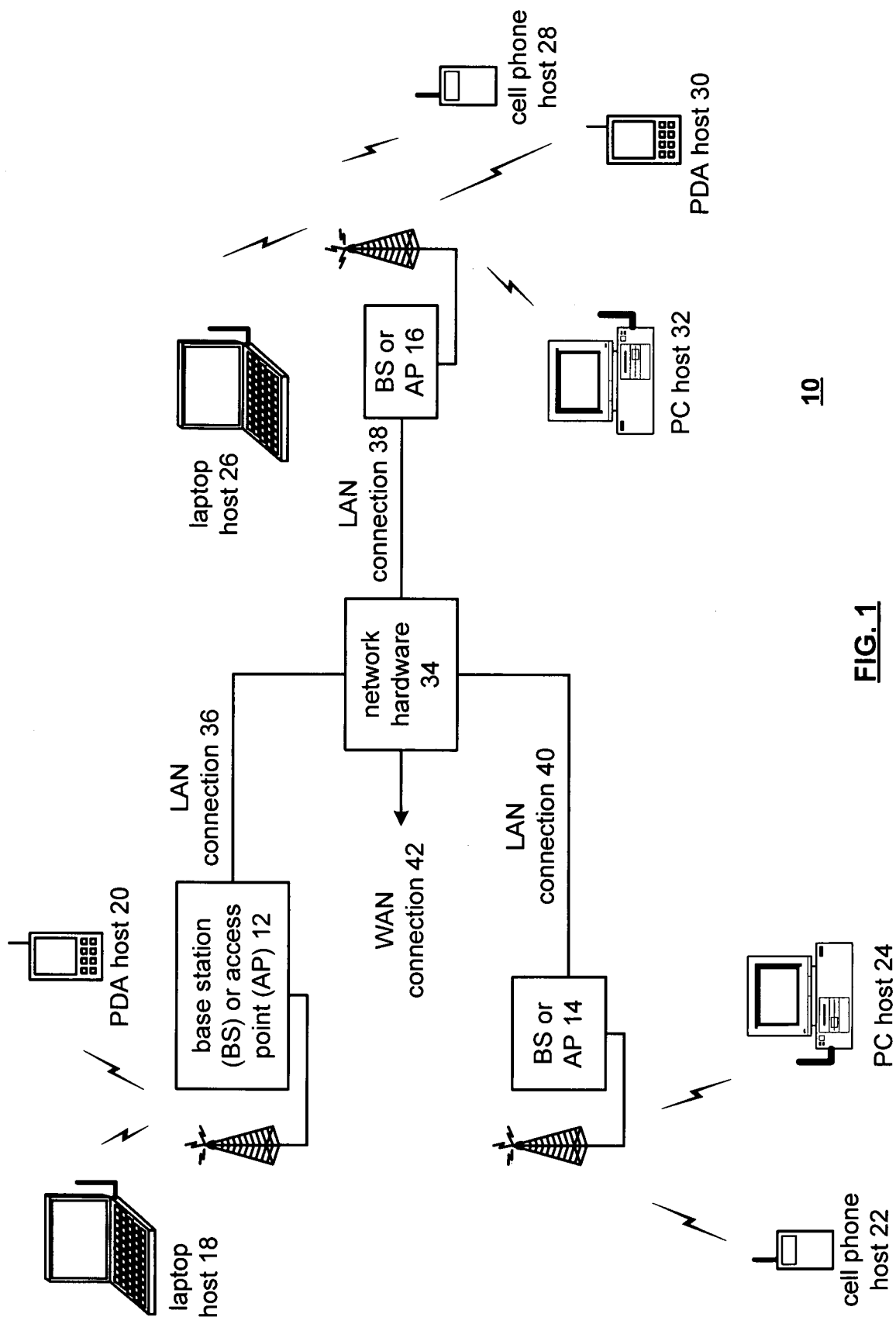
FIG. 1 is a schematic block diagram of a wireless communication system in accordance with the present invention.

FIG. 1 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 2:
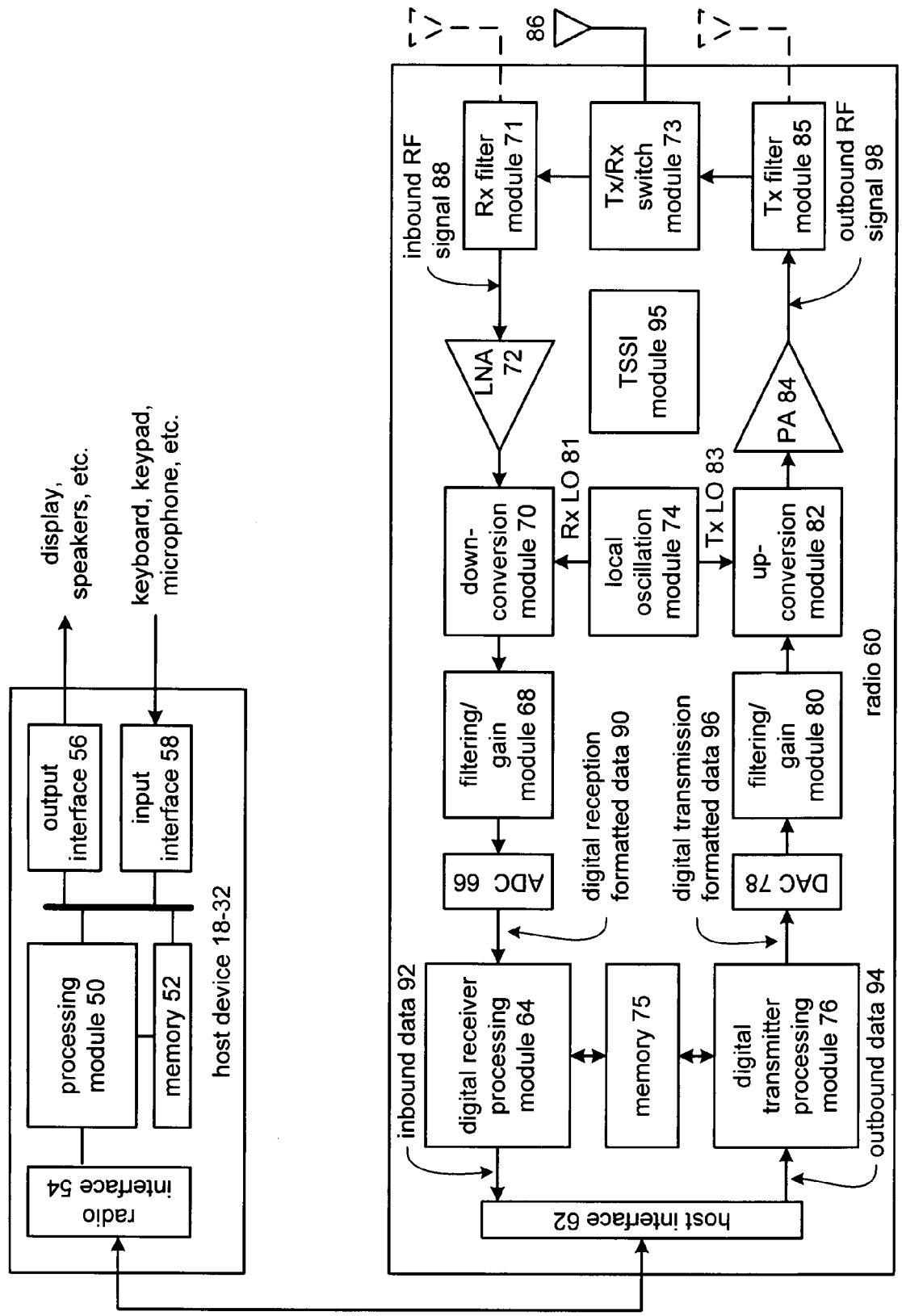
FIG. 2 is a schematic block diagram of a wireless communication device in accordance with the present invention.

FIG. 2 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/gain module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, a transmit signal strength indication (TSSI) module 95, and an antenna 86. The antenna 86 may be a single antenna that is shared by the transmit and receive paths as regulated by the Tx/Rx switch 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11 Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 3:
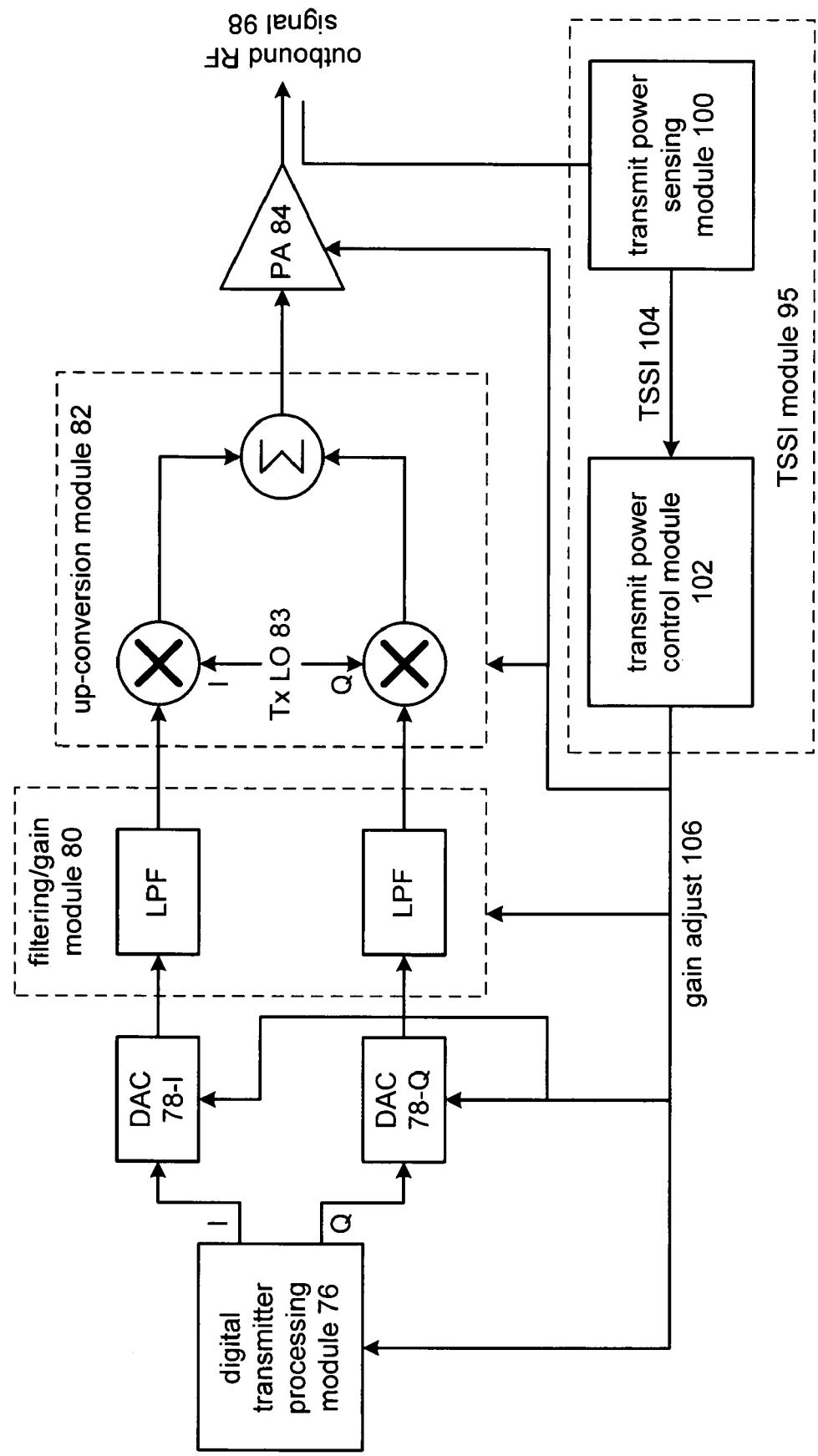
FIG. 3 is a schematic block diagram of a radio frequency transmitter of a wireless communication device in accordance with the present invention.

FIG. 3 is a schematic block diagram of the RF transmitter section of the wireless communication device in FIG. 2. As shown, the RF transmitter includes the digital transmit processing module 76, complex digital-to-analog inverter 78-I and 78-Q, the filter/gain module 80, the up-conversion module 82, the power amplifier 84, and the TSSI module 95. The filter/gain module 80 includes two low pass filters (LPF). The up-conversion module 82 includes two multipliers, or mixers, and a summation module. The TSSI module 95 includes a transmit power sense module 100 and a transmit power control module 102.

In operation, the digital transmitter processing module 76 converts outbound data into outbound baseband signals, which include an in-phase component (I) and a quadrature component (Q) in accordance with one of a plurality of encoding protocols. For example, if the RF transmitter is supporting IEEE802.11g, the encoding protocols include direct sequence spread spectrum (DSSS), complimentary code keying (CCK) and orthogonal frequency division multiplexing (OFDM). As is known, each of these particular encoding protocols includes multiple data rates. For example, DSSS may have a 1 megabit-per-second data rate or a 2 megabits-per-second data rate, CCK may have a 5.5 or 11 megabits-per-second data rate and OFDM may have a 6, 9, 12, 18, 24, 36, 48, or 54 megabits-per-second data rate. The digital-to-analog converters 78-I and 78-Q convert the in-phase and quadrature baseband signal components into analog signals. The filter/gain module 80 via the low pass filters the in-phase and quadrature baseband signal components and provides them to the up-conversion module 82.

The up-conversion module 82 mixes the in-phase baseband signal components with an in-phase (I) transmit local oscillation 83. The other mixer mixes the quadrature baseband signal components with a quadrature (Q) component of the transmit local oscillation 83. The outputs of the mixers are then summed to produce an RF signal. The power amplifier amplifies the RF signal to produce the outbound RF signals 98.

The transmit power sense module 100 senses the transmit power level of the outbound RF signals 98 and produces a corresponding transmit signal strength indication (TSSI) 104. The transmit power sense module 100 may be implemented in accordance with the teachings of co-pending patent applications:

1. HIGH FREQUENCY SIGNAL POWER DETECTOR, having a filing date Aug. 21, 2003 of and a Ser. No of 10/645,126;

2. HIGH FREQUENCY SIGNAL PEAK DETECTOR, having a filing date of Aug. 21, 2003 and a Ser. No. of 10/645,028; and 3. HIGH-SPEED SIGNAL POWER DETECTION CIRCUIT, having a filing date of Aug. 21, 2003 and a Ser. No. of 10/645,031.

The transmit power control module 102, which may be a separate processing module, or included within the processing module 76 and/or within processing module 64, interprets the TSSI 104 to produce a gain adjust signal 106. The gain adjust signal 106 may be used to adjust the manner in which the digital transmit processing module 76 encodes the outbound data, the gain of the digital-to-analog converters 78-I and 78-Q, the gain of the low pass filters (LPF), the gain of the mixers of the up-conversion module 82 and/or the gain of the power amplifier 84. Typically, the gain adjust 106 will adjust the gain of the power amplifier 84 and/or of the mixers within the up-conversion module 82. The determination of the gain adjust signal 106 is further based on the encoding protocol 124 as used by the RF transmitter to encode the outbound data to produce the outbound baseband signals via the digital transmit processing module 76. Accordingly, when the encoding protocol 124 corresponds to a lower data rate encoding protocol (e.g., DSSS or CCK) the gain adjust signal will set the gain of the power amplifier or one of the other components at a higher level such that the transmit power is at a $1^{st}$ constant transmit power level (e.g., 17.5 dBm). When the encoding protocol 124 corresponds to a higher data rate (e.g., OFDM), the transmit power control module 102 sets the gain adjust signal 106 such that the transmit power is at a $2^{nd}$ constant power level (e.g., 13.5 dBm).

Figure 4:
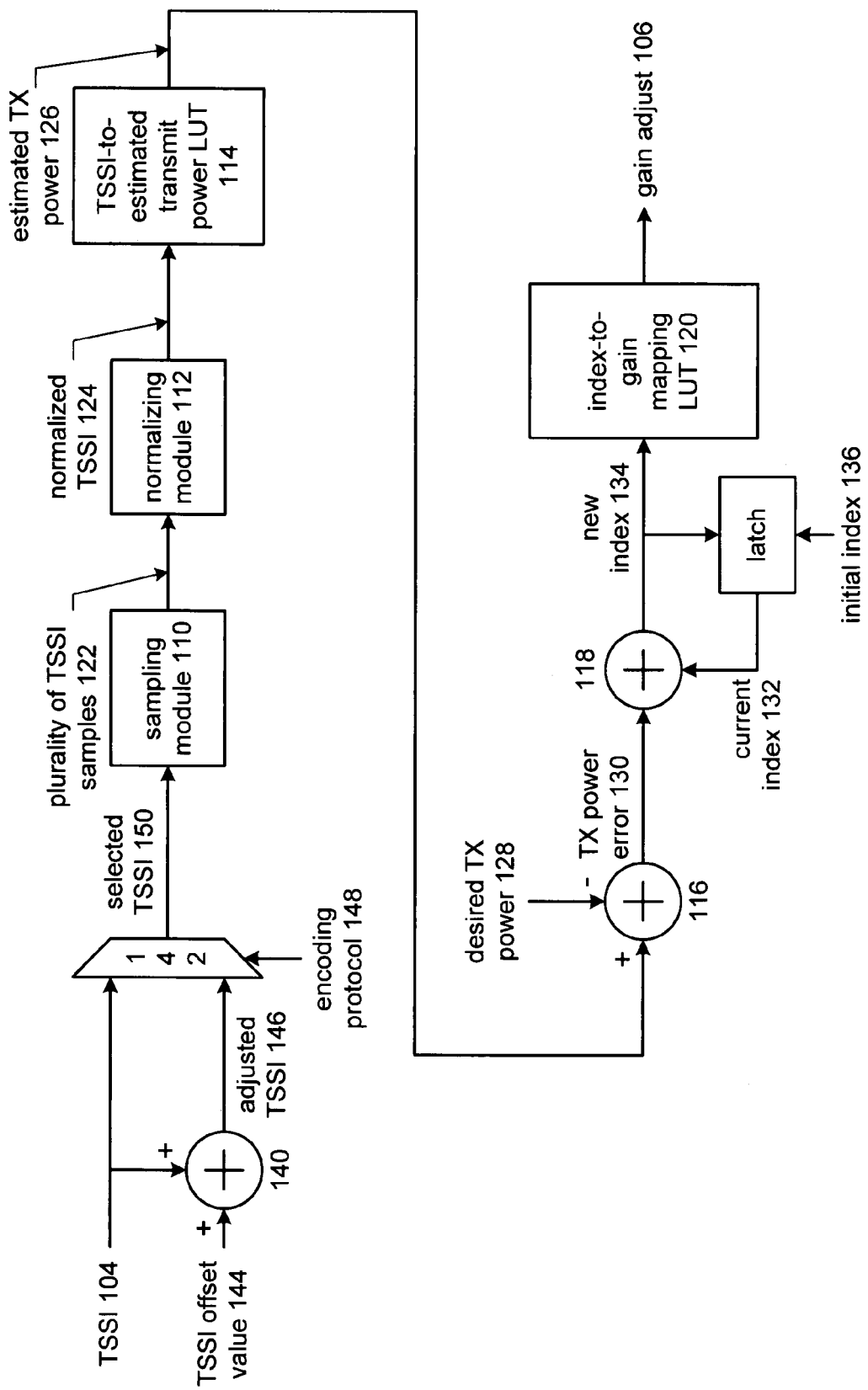
FIG. 4 is a schematic block diagram of a transmit power control module in accordance with the present invention.

FIG. 4 is a schematic block diagram of the transmit power control module 102 that includes a summation module 140, multiplexer 142, sampling module 110, normalizing module 112, TSSI to estimated transmit power lookup table 114, subtraction module 116, addition module 118, a latch, and an index-to-gain mapping lookup table 120. In operation, the multiplexer 142 outputs the TSSI value 104 or the adjusted TSSI value 146 as the selected TSSI value 150 based on the encoding protocol 148. The adjusted TSSI value 146 is produced by summing the TSSI value 104 with a TSSI offset value 144. For example, if the encoding protocol 148 is DSSS, or CCK, the multiplexer 142 will output the TSSI value 104 to produce the selected TSSI value 150. If, however, the encoding. protocol 148 is OFDM, the multiplexer 142 outputs the adjusted TSSI value 146 as the selected TSSI value 150.

The sampling module 110 samples the selected TSSI value 150 at a particular sampling rate to produce a plurality of TSSI samples 122. The sampling rate is dependent on the frame size of the particular encoding protocol used and may be established by using counter, for example an 8-bit counter.

The normalizing module 112 receives the plurality of TSSI samples 122 and produces a normalized TSSI value 124. In essence, the normalizing module 112 determines an average value from the plurality of TSSI samples 122. In one embodiment, the. normalizing module 112 may be implemented by using a $2^N$ integrator with a corresponding sample-and-hold output.

The TSSI to estimate transmit power lookup table 114 receives the normalized TSSI value 124 and utilizing it as an index, or address, determines an estimated transmit power 126. The normalized TSSI value 124 may be provided to the TSSI estimated transmit power level at intervals corresponding to a frame of data of the encoding protocol 148. Further, the normalized TSSI value may be provided at multiple time intervals of a frame or fractional portions of a frame.

The estimated transmit power 126 is then converted to a transmit power error 130 by subtracting the desired transmit power 128 there from. Essentially, the subtraction module 116 is performing a comparison function. For example, if the desired transmit power 128 is 17.5 dBm, if the selected TSSI value 150 is also 17.5 dBm then the transmit power error 130 is zero. If, however, the selected TSSI value 150, when converted to an estimated transmit power 126 is not equal to 17.5 dBm in this example, a transmit power error exists.

The transmit power error 130 is used to produce an index for accessing the index-to-gain mapping lookup table 120. Initially, an initial index 136 is loaded into the latch which is used as the index to address the index-to-gain lookup mapping table 120 to produce an adjusted gain adjust 106. The initial index 136 is selected such that the gain adjust 106 produces the desired transmit power level at the output of the radio frequency transmitter. Accordingly, if a transmit power error exists 130, the current index 132, which is retrieved from the latch, is adjusted by the transmit power error to produce a new index 134. The new index. 134 is used to address the index-to-gain mapping lookup table 120 to produce a new gain adjust value 106. Accordingly, if the transmit power error 130 indicates that the output power is too low, the new index 134 causes the lookup table 120 to output a gain adjust value 106 that increases the transmit power. Conversely, if the transmit power error 130 indicates that the actual transmit power is below the desired transmit power level 128, the new index 134 causes the lookup table 120 to output a gain adjust value 106 that lowers the output transmit power. In one embodiment, the gain adjust value 106 includes one or more of a digital-to-analog converter gain adjust, radio frequency integrated circuit gain adjust, which includes adjusting the mixer value and/or the power amplifier gain settings, and/or adjusting the baseband processing.

As one of average skill in the art will appreciate, the level shifting of the power may be done in a variety of ways. For example, the TSSI value 104 may be converted into an estimated transmit power 126 via the look up table (LUT) 114. The estimated transmit power 126 may then be passed to the indexing circuitry (116, 118, and latch) of the gain mapping LUT 120 directly or have an estimated power offset added to it prior to being passed to the indexing circuitry. As such, the converting the normalized TSSI into an estimated transmit power may be done by a LUT and then adding an estimated power offset or not.

Figure 5:
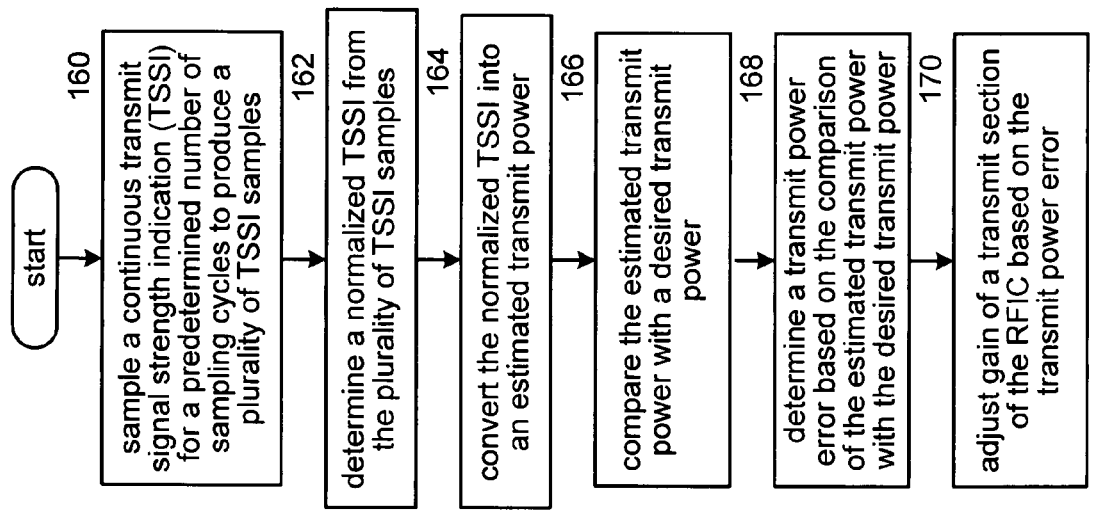
FIG. 5 is a logic diagram of a method for controlling transmit power of a radio frequency integrated circuit in accordance with the present invention.

FIG. 5 is a logic diagram of a method for controlling transmit power of a radio frequency integrated circuit. The process begins at Step 160 where a continuous transmit signal strength indication (TSSI) is sampled for a predetermined number of sampling cycles to produce a plurality of TSSI samples. The predetermined number of sampling cycles may correspond to a selected number of samples within a given frame that corresponds to the encoding protocol. The process then proceeds to Step 162 where a normalized TSSI value is determined from the plurality of TSSI samples. The process then proceeds to Step 164 where the normalized TSSI value is converted into an estimated transmit power. This may be done as previously described with reference to FIG. 4.

The process then proceeds to Step 166 where the estimated transmit power is compared with a desired transmit power. The process then proceeds to Step 168 where a transmit power error is determined based on the comparison of the estimated transmit power with the desired transmit power. The processing then proceeds to Step 170 where gain of the transmitter section of the radio frequency integrated circuit is adjusted based on the transmit power error such that the estimated transmit power substantially matches the desired transmit power. This was illustrated with reference to FIG. 4.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2. or when the magnitude of signal 2 is less than that of signal 1.

The preceding discussion has presented a method and apparatus for controlling transmit power of a radio frequency integrated circuit. As one of average skill in the art will appreciate, other embodiments may be derived from the teaching of the present invention without deviating from the scope of the claims.

What is claimed is:

1. A radio frequency integrated circuit (RFIC) transmitter comprises:
   a digital transmitter processing module coupled to convert outbound data into an outbound baseband signal, wherein, when a gain adjust signal is provided to the digital transmitter processing module, gain of the outbound baseband signal is adjusted in accordance with the gain adjust signal;
   digital to analog converter coupled to convert the outbound baseband signal into an outbound analog baseband signal, wherein, when the gain adjust signal is provided to the digital to analog converter, gain of the outbound analog baseband signal is adjusted in accordance with the gain adjust signal;
   filter and gain module coupled to filter the outbound analog baseband signal to produce a filtered outbound analog baseband signal, wherein, when the gain adjust signal is provided to the filter and gain module, gain of the filtered outbound analog baseband signal is adjusted in accordance with the gain adjust signal;
   an up-conversion module coupled to convert the filtered outbound analog baseband signal into a radio frequency (RF) signal based on a local oscillation, wherein, when the gain adjust signal is provided to the up-conversion module, gain of the RF signal is adjusted in accordance with the gain adjust signal;
   a power amplifier coupled to amplify the RF signal to produce an outbound RF signal, wherein, when the gain adjust signal is provided to the power amplifier, gain of the outbound RF signal is adjusted in accordance with the gain adjust signal; and
   a transmit signal strength module coupled to generate the gain adjust signal based on a measure of transmit power of the outbound RF signal, wherein the transmit signal strength module provides the gain adjust signal to at least one of the digital transmitter processing module, the digital to analog converter, the filter and gain module, the up-conversion module, and the power amplifier.

2. The RFIC transmitter of claim 1, wherein the transmit power control module comprises:
   a transmit power sensing module coupled to determine the transmit power of the outbound RF signal; and
   a transmit power control module coupled to interpret the transmit power of the outbound RF signal to generate the gain adjust signal.

3. The RFIC transmitter of claim 1, wherein the transmit power sensing module functions to determine the transmit power by:
   sampling a continuous transmit signal strength indication (TSSI) of the outbound RF signal for a predetermined number of sampling cycles to produce a plurality of TSSI samples;
   determining a normalized TSSI from the plurality of TSSI samples; and
   converting the normalized TSSI into an estimated transmit power.

4. The RFIC transmitter of claim 3, wherein the transmit power control module functions to generate the gain adjust signal by:
   comparing the estimated transmit power with a desired transmit power;
   determining a transmit power error based on the comparison of the estimated transmit power with the desired transmit power; and
   generating the gain adjust signal based on the transmit power error such that the estimated transmit power substantially matches the desired transmit power.

5. The RFIC transmitter of claim 4, wherein the generating the gain adjust signal comprises:
   converting the transmit power error into an index offset;
   adjusting a current index by the index offset to produce a new current index; and
   accessing a gain look-up table based on the new current index to obtain a gain of the gain adjust signal.

6. The RFIC transmitter of claim 1, wherein the transmit signal strength module further functions to:
   exclusively provide the gain adjust signal to the power amplifier.

7. The RFIC transmitter of claim 1, wherein the transmit signal strength module further functions to:
   exclusively provide the gain adjust signal to the up-conversion module.

8. The RFIC transmitter of claim 1, wherein the transmit signal strength module further functions to determine the gain adjust signal by:
   determining an encoding protocol used by the digital transmitter processing module;
   when the encoding protocol is of a first rate, setting gain of the gain adjust signal to a first transmit power level; and
   when the encoding protocol is of a second rate, setting the gain of the gain adjust signal to a second transmit power level.

* * * * *